United States Patent [19]

Kozlowski

[11] 4,256,011

[45] * Mar. 17, 1981

[54] BRAIDED PACKING AND METHOD AND APPARATUS FOR MAKING PACKING

[75] Inventor: Peter F. Kozlowski, Billerica, Mass.

[73] Assignee: A. W. Chesterton Company, Stoneham, Mass.

[ * ] Notice: The portion of the term of this patent subsequent to Jul. 18, 1995, has been disclaimed.

[21] Appl. No.: 924,520

[22] Filed: Jul. 14, 1978

Related U.S. Application Data

[63] Continuation-in-part of Ser. No. 754,254, Dec. 27, 1976, Pat. No. 4,100,835.

[51] Int. Cl.³ .............................................. D04C 1/06
[52] U.S. Cl. ..................................... 87/6; 87/1; 87/7; 277/230
[58] Field of Search ............................ 87/1, 5–8; 277/229, 230

[56] References Cited

U.S. PATENT DOCUMENTS

| | | | |
|---|---|---|---|
| 77,275 | 4/1868 | Glanding | 87/1 |
| 239,287 | 3/1881 | Winans | 87/6 |
| 731,458 | 6/1903 | Hughes et al. | 87/6 X |
| 741,056 | 10/1903 | Montgomery | 87/6 |
| 1,446,141 | 2/1923 | Adams, Jr. | 87/6 |
| 1,771,912 | 7/1930 | Blaisdell | 87/6 |
| 1,930,766 | 10/1933 | Moore | 87/6 |
| 2,183,336 | 12/1939 | Miller | 277/230 X |
| 2,221,453 | 11/1940 | Miller | 87/6 X |
| 2,398,210 | 4/1946 | Cumming et al. | 87/6 |
| 3,124,032 | 3/1964 | Webster et al. | 87/1 |
| 3,341,211 | 9/1967 | Houghton et al. | 277/230 X |
| 3,403,595 | 10/1968 | Watson | 87/1 |
| 3,646,846 | 3/1972 | Houghton et al. | 87/1 |
| 3,791,658 | 2/1974 | Zumeta et al. | 277/230 |
| 3,805,667 | 4/1974 | Orser | 87/6 |

FOREIGN PATENT DOCUMENTS 1185022 1/1965 Fed. Rep. of Germany .

*Primary Examiner*—John Petrakes

[57] ABSTRACT

A braided packing comprises a plurality of outer core strands, braided together with a plurality of braid strands, the outer core strands extending helically along said packing and forming with the braid strands a braid having a normal twist extending helically in one direction, the braid strands extending over the core strands in a continuous helical pattern at an angle to the outer core strands and the normal helical twist of the braid, and a plurality of warp strands in rows between said braid strands extending helically in a direction opposite said braid strands. Apparatus for making the braided packing comprises a rotatable condenser adapted to grip the braid at the point to which the braid strands extend for braiding together and means for rotating the condenser. The method of braiding comprises rotating the braid at the point at which the braid strands come together.

5 Claims, 6 Drawing Figures

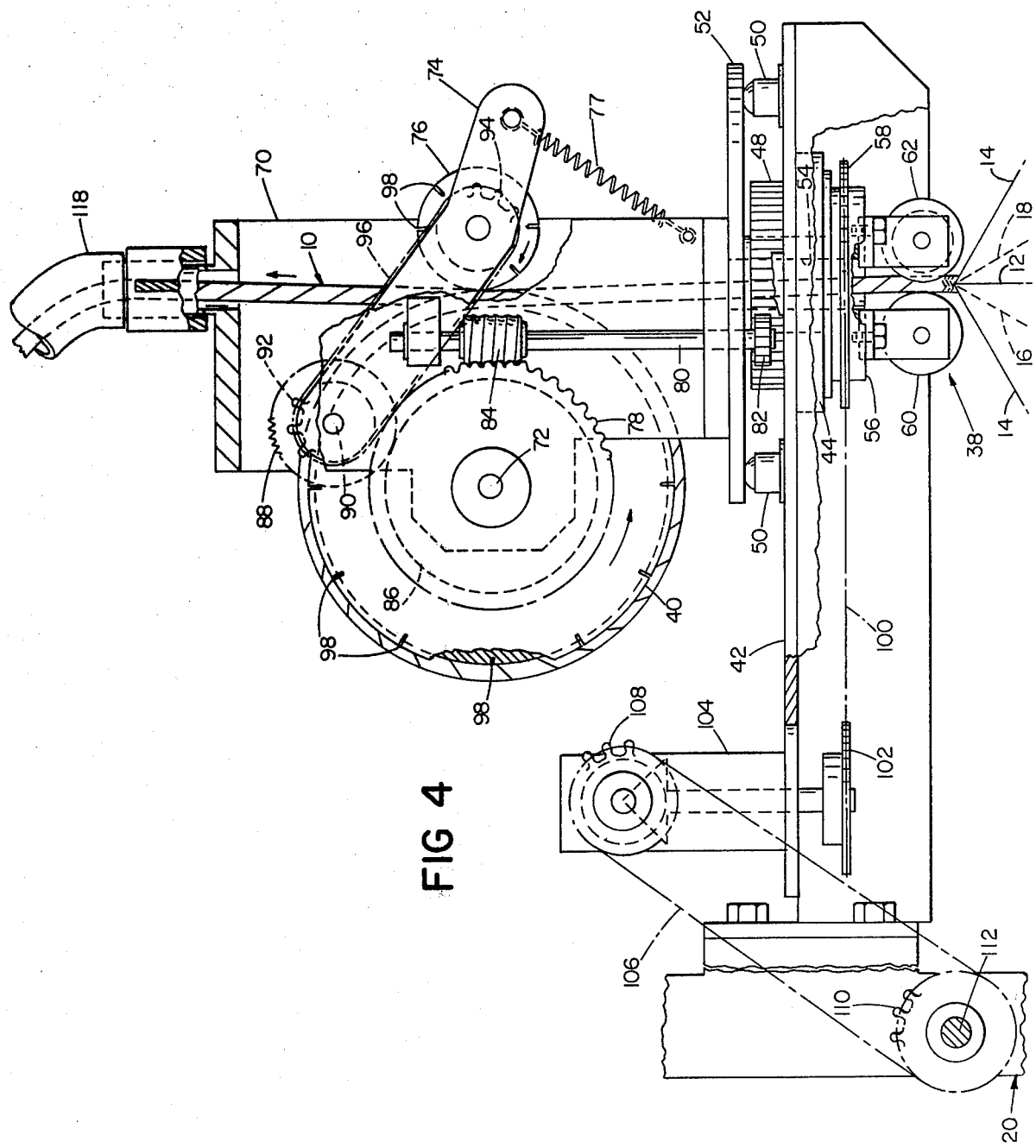

BRAIDED PACKING AND METHOD AND APPARATUS FOR MAKING PACKING

CROSS REFERENCE TO RELATED APPLICATION

This application is a continuation-in-part of U.S. application, Ser. No. 754,254, filed Dec. 27, 1976, now U.S. Pat. No. 4,100,835.

BACKGROUND OF THE INVENTION

This invention relates to packings and more particularly to braided packings comprising a plurality of strands braided together and further relates to a method and apparatus for making braided packings.

Braided packings are used extensively in industry for a variety of sealing purposes. Typically packings are made of flax, jute, asbestos or synthetic, such as polytetralouroethylene, fibers which are formed into yarns or strands and wich are barided together. The result is typically a packing havina square cross-section and hereingbone weave pattern exfendingd in an axial direction along the pcking; typcial such packings are illustrated in U.S. Pat. No. 3,646,846.

When standard prior art packings are wrapped around a shaft, however, they do not provide a uniform fiber density As they are wrapped about a shaft, the packing fibers at the inner diameter are compressed and those at the outer diameter are elongated. The result, with an initially square cross-section packing, is a trapeziodal cross-section providing a leakage path larger at the outer diameter than at the inner diameter. Additionally, the sealing characteristics of typical packings are static and substantial compression is required to effect sealing. Compression of the packing to control leakage causes increased pressure on the shaft and forces out lubrication from the packing, overheating and shortening the life of the packing and contributing to shaft wear.

In application Ser. No. 754,254, of which this is a continuation-in-part, a braided packing is disclosed which has a normal helical twist. The packing has a density of improved uniformity requiring less pressure for sealing, thereby enhancing packing and shaft life. The packing also functions to provide hydrodynamic sealing characteristics when properly oriented relative to shaft rotation, further reducing sealing pressure required and further contributing to extended packing and shaft life.

The method and apparatus disclosed in application Ser. No. 754,254, however, limit the style of the twisted braid which can be made. Thus, in making the braid, only the principal braid strands, all extending in the same helical direction, could be employed; warp strands extending helically in the opposite direction could not be employed due to inherent limitations in the disclosed method of making the braid which requires disabling the track normally carrying warp strands. The inability to utilize warp strands in the braid limited the size and the density of packings which could be made with a normal helical twist. Additionally, because of the normal direction of twist in the yarns employed as braid strands, it is desirable that operation of braiding machinery be limited to braid the braid strands in one direction; thus suitable braid would be produced having a helical twist only in a single direction.

SUMMARY OF THE INVENTION

It is a principal object of this invention to provide a braided packing having a normal helical twist which may extend in either direction. A further object of this invention is to provide a twisted braided packing which employs warp strands. A further object of this invention is to provide a braiding method and apparatus capable of braiding a packing having a normal helical twist in either direction without alteration of the basic braiding pattern and direction of machine operation and which permits the incorporation of warp strands into the braid.

In general, the invention features a braided packing comprising a plurality of rows of braid strands extending helically along the packing and forming a braid having a normal helical twist. The braid strands extend helically at an angle to the rows and the normal helical twist, in one embodiment extending in the same helical direction as the rows. In certain embodiments of the invention, warp strands form rows between the braid strand rows, the warp strands extending in a helical direction opposite that in which the braid strands extend. A central core strand and outer core strands over which the braid strands are braided are provided in particular embodiments of the invention.

The method of braiding comprises extending strands from carriers to a point of convergence, moving the carriers in a predetermined braiding pattern, gripping the braid at the point of convergence, and rotating the braid about its axis at the point of convergence as the carriers are moved to form the braid.

Apparatus for forming the braid comprises a plurality of strand carriers moveable in a predetermined braiding pattern and a condenser. The condenser is adapted to grip the braid as it is formed and is mounted for rotation about its axis. Drive means are connected to the condenser for rotating the condenser as the braid is formed. In one embodiment the drive means is connected to the carrier drive means for driving the condenser in proportion to the speed of the carriers.

DESCRIPTION OF THE DRAWINGS

Other objects, features and advantages of the invention will be apparent to those skilled in the art from the following detailed description of a preferred embodiment taken together with the accompanying drawings, in which:

FIG. 4 is an enlarged side elevation of the braid take-off assembly of the braiding machine of FIG. 2, illustrating modifications in accordance with the invention;

DETAILED DESCRIPTION

Figure 1:
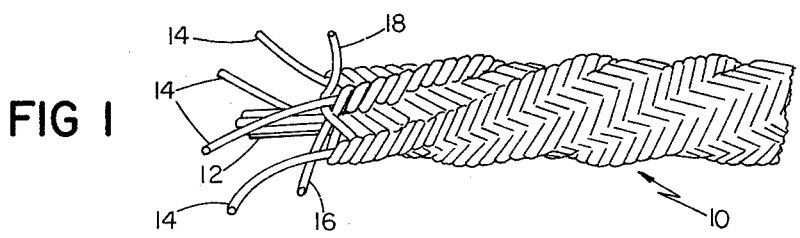
FIG. 1 is a side elevation of packing made according to the invention, partially illustrating the braiding of the packing strands.

The packing construction is illustrated in FIG. 1. The packing 10 comprises a central core strand 12 and a plurality, four in the illustrated embodiment, of outer core strands 14. Each of the core strands 12, 14 comprises a plurality of yarns of selected packing fibers. Braided around the core strands in a standard lattice braid pattern are a plurality of braid strands 16 and warp strands 18.

Braid strands 16 are interwoven about the outer core strands 14, the braid strands 16 extending over outer core strands 14 on the packing surface. The braid strands 16 all extend generally helically in a single direction presenting a helical pattern of parallel braid strands 16 extending in rows along the packing surface. The warp strands 18 extend helically in the opposite direction in rows between the rows of braid strands 16.

The outer core strands 14 extend helically along the packing surface and, together with the braid strands 16 form ridges with grooves at the position of the warp strands 18 therebetween, defining a braid having a normal helical twist of the major braid pattern. In particular embodiments, the helix describes 3-4 revolutions about the packing per linear foot of packing. The braid strands 16 lie at an angle to the helix of the braid and, in the illustrated embodiment, extend helically in the same general direction as the braid helix.

Figure 2:
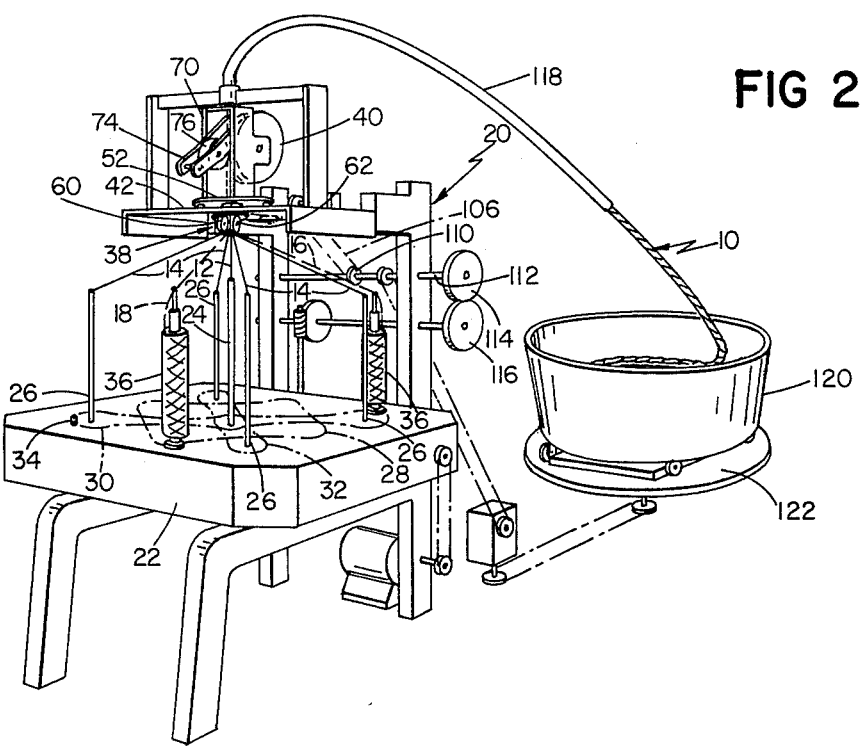
FIG. 2 is an isometric, somewhat diagrammatic view of a braiding machine modified in accordance with the invention.
Figure 3:
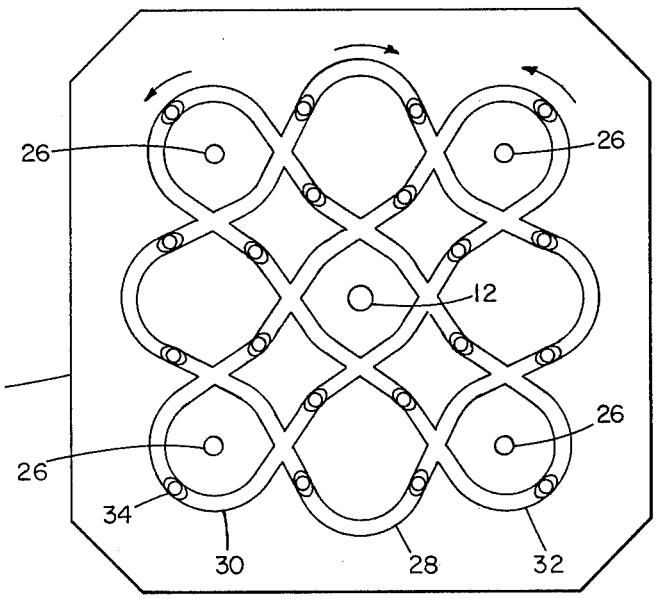
FIG. 3 is an enlarged diagrammatic plan view of the carrier table of the braiding machine of FIG. 2.

To make a packing 10, as thus described, a modified braiding machine 20, illustrated in FIG. 2 is employed. Braiding machine 20 comprises a conventional carrier table 22 having a plurality of tubular masts 24, 26 through which core strands 12, 14 extend from sources, not shown. Mast 24 for central core strand 12 is centrally positioned in table 22. Four masts 26 for outer core strands 14 are equidistantly positioned about the table. On the surface of the table 22 of braiding machine 20 are three carrier tracks 28, 30, 32. Track 28 has a generally square configuration extending around central mast 24 and inside of the four masts 26. Tracks 30, 32 extend diagonally and cross each other, one track 30 extending on the outside of two diagonally opposite masts 26 and the other track extending on the outside of the other two diagonally opposite masts 26. A plurality of carriers 34 are located on each track carrying bobbins 36 (only two are illustrated in FIG. 2) of braid and warp strands 16, 18. As best shown in FIG. 3, in the illustrated embodiment, eight carriers 34 are utilized on track 28 for the warp strands 18 and six carriers 34 are utilized on each of tracks 30, 32 for the braid strands 16. The carriers are equidistantly spaced along the tracks and move in the directions indicated by the arrows in FIG. 3. As thus described the machine 20 comprises a standard 20 carrier lattice braider. Strands 12, 14, 16, 18 extend from bobbin 36 to a condenser 38 for braiding in the normal manner.

The braiding machine 20 is modified above the table 22. Instead of the condenser and take-off wheel normally employed in such machines, the condenser 38 is modified to grip the packing 10 as it is braided and is mounted for rotation as braiding proceeds.

Figure 6:
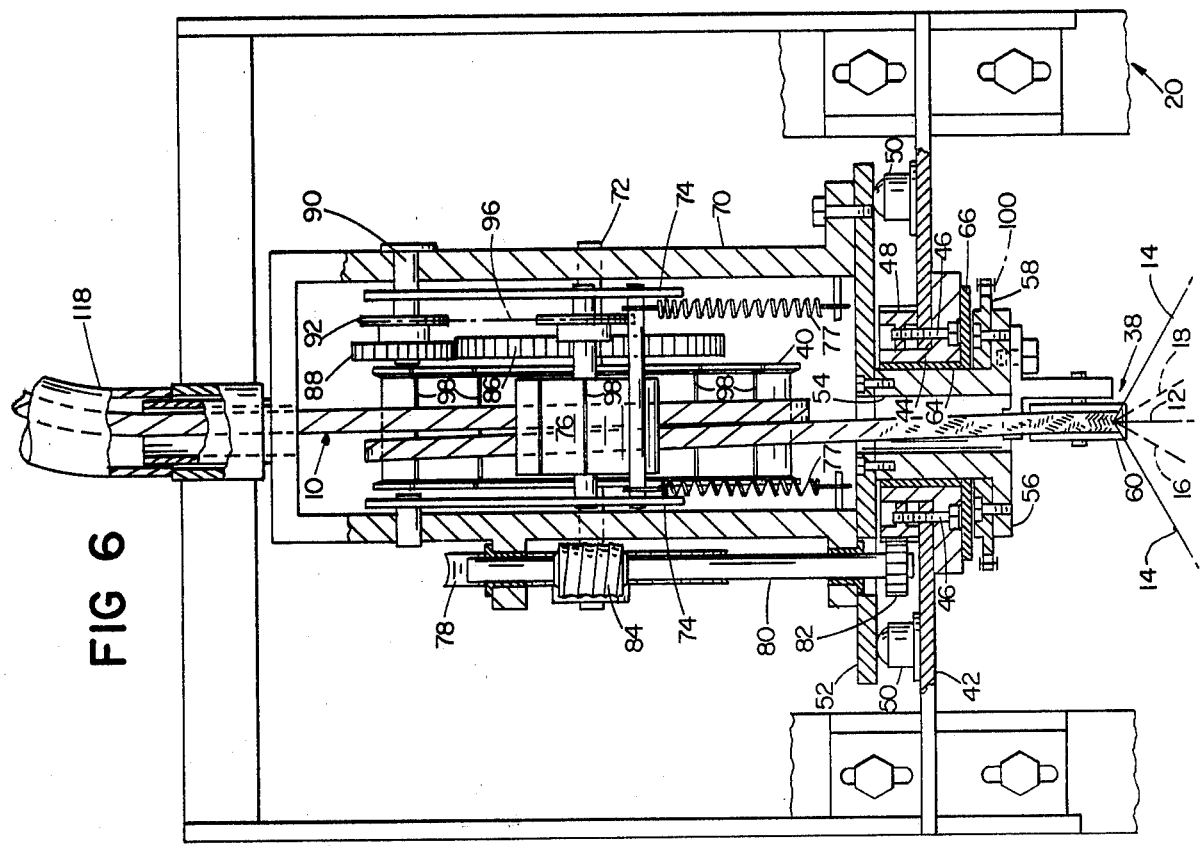
FIG. 6 is a front view of the portion of the braiding machine illustrated in FIG. 4.
Figure 5:
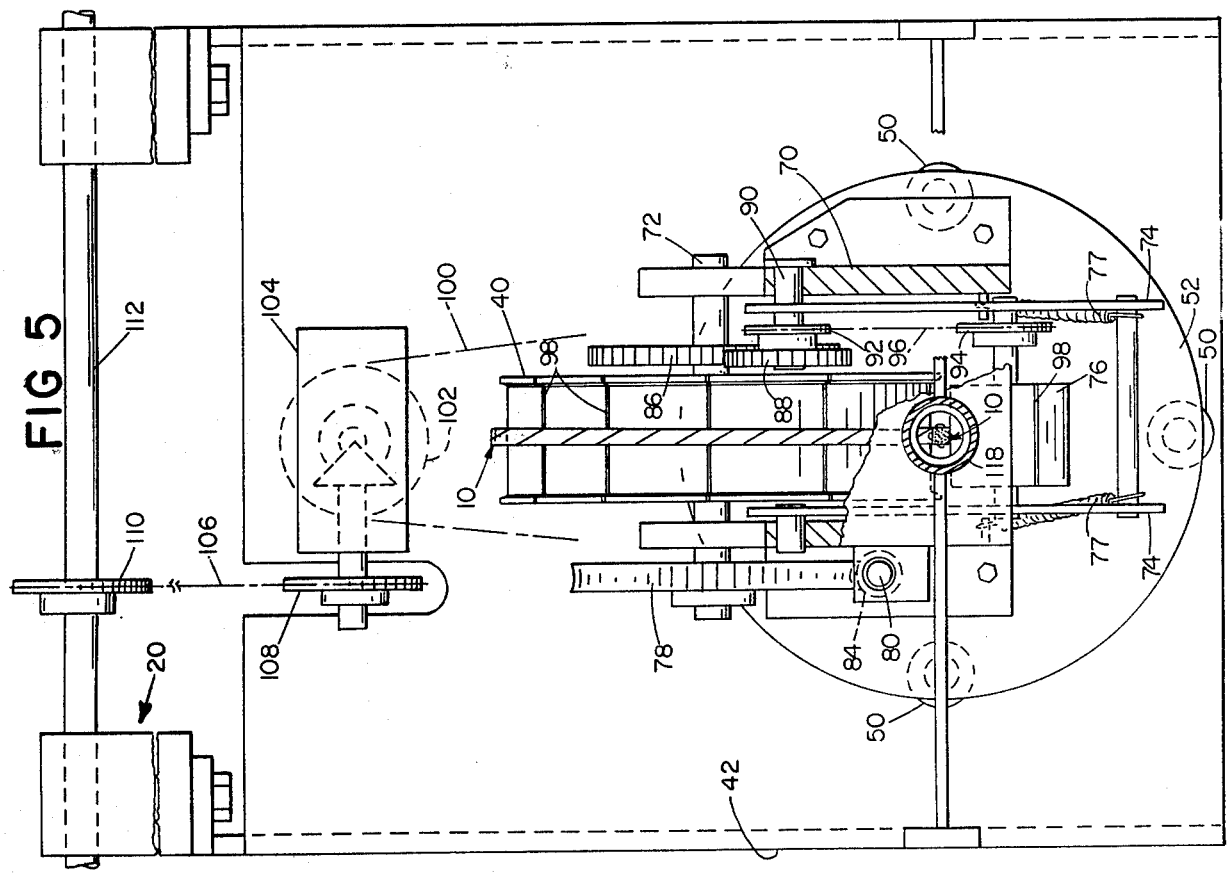
FIG. 5 is a plan view of the portion of the braiding machine illustrated in FIG. 4.

The modifications to the braid take-off assembly are shown in detail in FIGS. 4, 5 and 6. As illustrated, a stationary platform 42 is supported above carrier table 22. A guide member 44 having an axially extending collar is fastened to the platform 42 with the collar extending through the platform 42 coaxially of the tracks 28, 30, 32 and mast 24 on carrier table 22. Bolts 46 extending through guide member 44 and platform 42 secure an external ring gear 48 to the upper side of the platform coaxially of member 44. A plurality of spaced bearings 50 on the upper surface of platform 42 support a rotatable take-off assembly platform 52. A tubular member 54 is connected to rotatable platform 52 and extends therefrom through guide 44 and platform 52. A flange 56 on member 54 supports a chain sprocket member 58 which is fastened on the upper side thereof. On the lower side of flange 56, condenser 38 is fastened. The condenser 38 comprises a pair of idler wheels 60, 62, one of which, 62, is grooved. The wheels 60, 62 are adjustable toward and away from each other to accommodate different size packings. Annular bearing 64 is positioned between guide member 44 and tubular member 54 and a disc bearing 66 is positioned between the face of sprocket member 58 and guide member 44.

A frame 70 is mounted on and extends above rotatable platform 52. Take-off wheel 40, of reduced diameter, is supported by shaft 72 substantially tangentially to the axis of rotation of platform 52. Lever arms 74, connected at one end to frame 70, support a nip roll 76 against wheel 40 also tangentially to the axis of rotation of platform 52. Springs 77 urge nip roll 76 toward wheel 40. A worm gear 78 is mounted on one end of shaft 72 for driving wheel 40.

A worm shaft 80 supported by frame 70 and platform 52 has a pinion 82 at one end engaging ring gear 48 for driving shaft 80 as platform 52 is rotated. Worm shaft 80 has a worm 84 at its other end engaging worm gear 78 to drive wheel 40. In the illustrated embodiment the wheel 40 is driven to have its peripheral surface move one foot for every 3-4 revolutions of platform 52. At the other end of shaft 72 another gear 86 is provided which engages a gear 88 on the shaft 90 supporting one of lever arms 74. Sprocket members 92, 94 connected to gear 88 and nip roll 76 are driven by chain 96. Preferably nip roll 76 is driven at a peripheral speed slightly greater than wheel 40, about 5% faster to prevent slack from developing in braid extending about the wheel 40. Optionally, saw-toothed members may be provided in the slots 98 in wheel 40 and roll 76 to grip the packing, although if roll 76 is driven faster than wheel 40 it may be desired to omit teeth from the roll 76 to avoid damaging the packing; alternatively either of the wheel or roll may be covered with a covering having a textured surface to assist in gripping the packing.

Platform 52 is driven by chain 100 extending from sprocket member 58 to another sprocket 102 which is connected to right angle drive 104. Drive 104 is driven by chain 106 extending about sprocket members 108, 110. Sprocket member 110 is mounted on shaft 112 driven by change gears 114, 116, shown in FIG. 1, which are connected to the main machine drive. Gears 114, 116 may be changed to alter the drive speed of the take-off assembly relative to the carriers to accommodate various braid sizes.

Extending from frame 70 above wheel 40 is a guide tube 118 extending to a basket 120 behind the machine for collecting packing as it is braided. Basket 120 is mounted on rotatable platform 122 which is connected to the machine drive for synchronous rotation in the same direction as platform 52. The rotation of platform 122 and basket 120 prevents tangling of the packing as it is delivered to the basket.

The braiding method performed by the machine is modified by the condenser of the take-off assembly. Thus, the strands 12, 14, 16, 18 extend to a point of convergence at condenser 38 and are interwoven in normal manner as carriers 34 move bobbins 35 on tracks 28, 30, 32 about table 22. Wheels 60, 62, however, hold the packing as it is braided. The packing extends from condenser 38, between wheel 40 and roll 76, once around the wheel 40, between wheel 40 and roll 76 again and then through tube 118 to rotating basket 120. As the take-off assembly is rotated while braiding progresses, condenser wheels 60, 62 continuously turn the packing 10 about its axis resulting in a normal helical twist being formed in the braid. The take-off assembly rotation is proportional to the braiding machine drive speed.

Advantageously, the helical twist can be formed in either direction. Although the illustrated machine is arranged to turn the take-off assembly in only one direction and thus to form a braid helix in one direction, the helix can be formed in the opposite direction simply by altering the drive to the take-off assembly to reverse the direction of its rotation while maintaining the direction of motion of the carriers 34 in table 22 and the normal braiding pattern. As another advantage, the method permits the incorporation of warp strands into the braid. The operation of the take-off assembly and the performance of the method, however, is independent of the incorporation of warp strands and even core strands; thus helical braiding can be accomplished with a variety of braid styles.

After the braid is formed, it may be impregnated with lubricants and be pressed to a square cross-sectional configuration in the usual manner.

Other embodiments of this invention will be apparent to those skilled in the art which are within the scope of the following claims.

What is claimed is:

1. Braided packing comprising a plurality of outer core strands extending generally axially along said packing and a plurality of braid strands braided together about said core strands, said outer core strands extending helically along said packing and forming with said braid strands a braid having a normal helical twist in one direction and said braid strands extending over said core strands in one helical direction at an angle to said outer core strands and said normal helical twist.

2. The braided packing claimed in claim 1 in which said normal helical twist and said braid strands both extend in the same helical direction.

3. Braided packing comprising a plurality of outer core strands extending generally axially along said packing and a plurality of braid strands braided together about said core strands, said outer core strands extending helically along said packing and forming with said braid strands a braid having a normal helical twist in one direction and said braid strands extending over said core strands in one helical direction at an angle to said outer core strands and said normal helical twist, said packing further comprising rows of warp strands between rows of said braid strands, said warp strand rows extending helically along said packing in the direction of said normal helical twist and said warp strands extending in a helical direction opposite that in which said braid strands extend.

4. The braided packing claimed in claim 3 further comprising a central core strand extending axially along said packing centrally of said outer core strands, said outer core strands spaced equidistantly thereabout.

5. The braided packing claimed in either of claims 3 or 4 in which said normal helical twist and said braid strands both extend in the same helical direction.

* * * * *

UNITED STATES PATENT AND TRADEMARK OFFICE
CERTIFICATE OF CORRECTION

PATENT NO. : 4,256,011                                          Page 1 of 2

DATED : March 17, 1981

INVENTOR(S) : Peter F. Kozlowski

It is certified that error appears in the above-identified patent and that said Letters Patent are hereby corrected as shown below:

Col. 1, line 20, "polytetralouroethylene" should be --polytetraflouroethylene--;

Col. 1, line 21, "wich are barided" should be --which are braided--;

Col. 1, line 22, "havina" should be --having a--;

Col. 1, line 23, "hereingbone" should be --herringbone--;

Col. 1, line 23, "exfendingd" should be --extending--;

Col. 1, line 24, "pcking; typcial" should be --packing; typical--;

UNITED STATES PATENT AND TRADEMARK OFFICE
CERTIFICATE OF CORRECTION

PATENT NO. : 4,256,011

DATED : March 17, 1981

INVENTOR(S) : Peter F. Kozlowski

It is certified that error appears in the above-identified patent and that said Letters Patent are hereby corrected as shown below:

Col. 1, line 28, "density As" should be --density. As--;

Col. 1, line 32, "trapeziodal" should be --trapezoidal--.

Signed and Sealed this

Twenty-eighth Day of July 1981

[SEAL]

Attest:

Attesting Officer

GERALD J. MOSSINGHOFF

Commissioner of Patents and Trademarks